United States Patent
Ohsawa et al.

(10) Patent No.: US 11,188,035 B2
(45) Date of Patent: Nov. 30, 2021

(54) CONTINUOUS CONTROL OF ATTENTION FOR A DEEP LEARNING NETWORK

(71) Applicant: INTERNATIONAL BUSINESS MACHINES CORPORATION, Armonk, NY (US)

(72) Inventors: Shohei Ohsawa, Tokyo (JP); Takayuki Osogami, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 755 days.

(21) Appl. No.: 16/039,934

(22) Filed: Jul. 19, 2018

(65) Prior Publication Data
US 2020/0026247 A1   Jan. 23, 2020

(51) Int. Cl.
*G06N 3/04* (2006.01)
*G05B 13/02* (2006.01)
*G06N 7/08* (2006.01)

(52) U.S. Cl.
CPC ........... *G05B 13/0265* (2013.01); *G06N 3/04* (2013.01); *G06N 7/08* (2013.01)

(58) Field of Classification Search
CPC . G06N 3/04; G06N 3/006; G06N 7/08; G05B 13/0265; A63F 13/10; A63F 13/44
See application file for complete search history.

(56) References Cited

U.S. PATENT DOCUMENTS

| | | |
|---|---|---|
| 9,754,221 B1 | 9/2017 | Nagaraja |
| 10,185,895 B1 * | 1/2019 | Tse ..................... G06N 3/0445 |
| 10,713,543 B1 * | 7/2020 | Skuin ................... G06K 9/6267 |
| 2015/0100530 A1 | 4/2015 | Mnih et al. |
| 2017/0076201 A1 | 3/2017 | van Hasselt et al. |
| 2018/0196587 A1 * | 7/2018 | Bialynicka-Birula ....................... G06T 3/0093 |
| 2020/0327378 A1 * | 10/2020 | Smith .................... G06N 5/048 |

OTHER PUBLICATIONS

Mnih, Volodymyr, et al. "Recurrent models of visual attention." arXiv preprint arXiv:1406.6247 (2014). (Year: 2014).*
Roderick, "Implementing the Deep Q-Network", 30th Conference on Neural Information Processing Systems, Nov. 2017, pp. 1-9.
Mnih, "Playing Atari with Deep Reinforced Learning", NIPS Deep Learning Workshop, Dec. 2013, pp. 1-9.
Sorokin, "Deep Attention Recurrent Q-Network", NIPS Deep Reinforcement Learning Workshop, Dec. 2015, pp. 1-7.

* cited by examiner

Primary Examiner — Hal Schnee
(74) Attorney, Agent, or Firm — Tutunjian & Bitetto, P.C.; Randall Bluestone

(57) ABSTRACT

A computer-implemented method for reducing computation cost associated with a machine learning task performed by a computer system by implementing continuous control of attention for a deep learning network includes initializing a control-value function, an observation-value function and a sequence of states associated with a current episode. If a current epoch associated with the current episode is odd, an observation-action is selected, the observation-action is executed to observe a partial image, and the observation-value function is updated based on the partial image and the control-value function. If the current epoch is even, a control-action is selected, the control-action is executed to obtain a reward corresponding to the control-action, and the control-value function is updated based on the reward and the observation-value function.

20 Claims, 7 Drawing Sheets

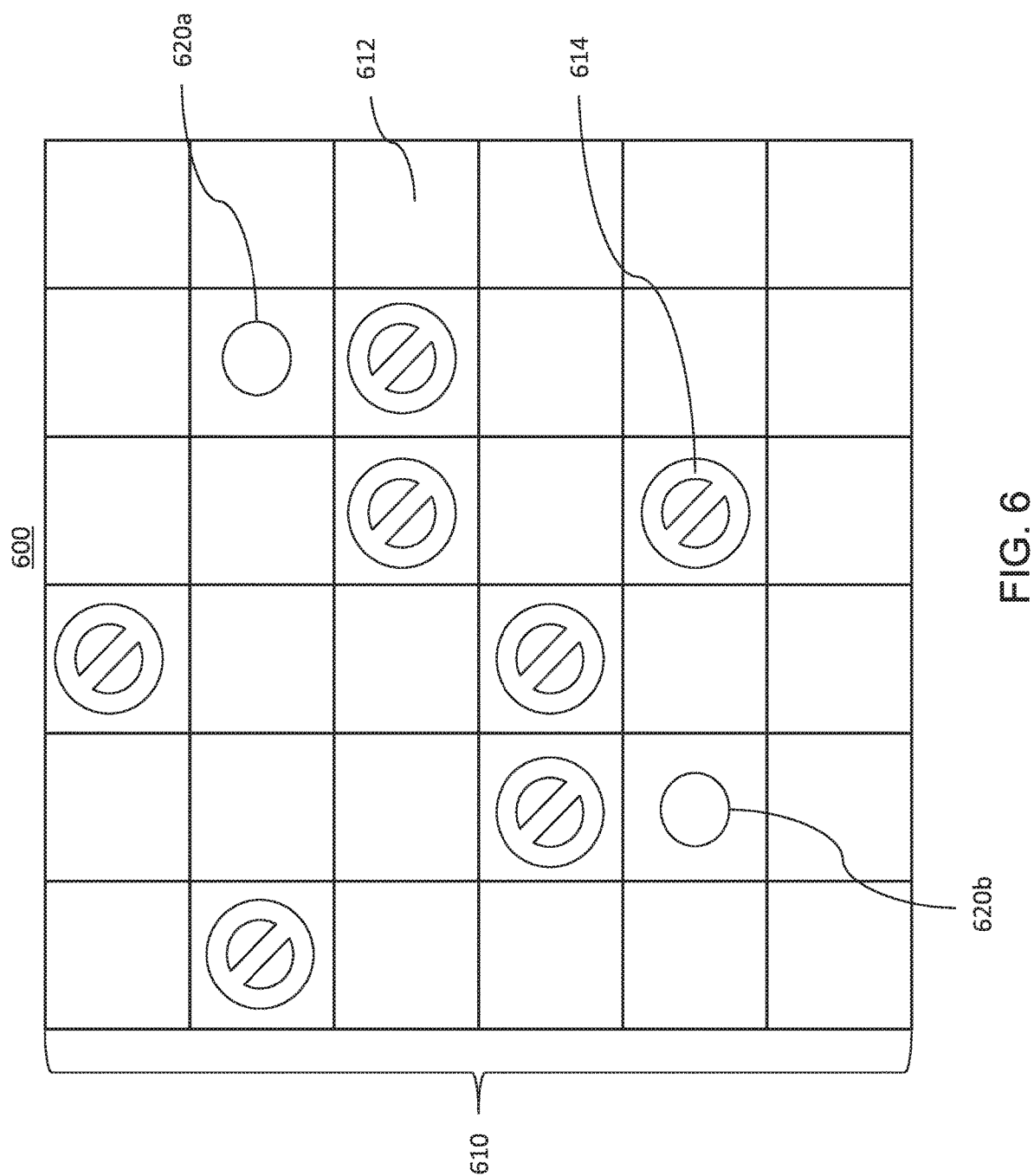

CONTINUOUS CONTROL OF ATTENTION FOR A DEEP LEARNING NETWORK

BACKGROUND

Technical Field

The present invention generally relates to machine learning and artificial intelligence, and more particularly to implementing continuous control of attention for a deep learning network.

Description of the Related Art

Deep learning is an emerging framework in the field of machine learning. Deep learning networks can be used to extract high-level features from raw sensory data, which can be applied toward a variety of applications in the field of artificial intelligence. For example, deep learning networks can employ deeply stacking neural networks (e.g., convolutional neural networks or CNNs).

SUMMARY

In accordance with an embodiment of the present invention, a method for reducing computation cost associated with a machine learning task performed by a computer system by implementing continuous control of attention for a deep learning network is provided. The method includes initializing, by at least one processor operatively coupled to a memory, a control-value function, an observation-value function and a sequence of states associated with a current episode. If a current epoch is odd of the current episode, the at least processor selects an observation-action, executes the observation-action to observe a partial image, and updates the observation-value function based on the partial image and the control-value function. If the current epoch is even, the at least one processor selects a control-action, executes the control-action to obtain a reward corresponding to the control-action, and updates the control-value function based on the reward and the observation-value function.

In accordance with another embodiment of the present invention, a system for reducing computation cost associated with a machine learning task performed by a computer system by implementing continuous control of attention for a deep learning network is provided. The system includes a memory device for storing program code and at least one processor operatively coupled to the memory device. The at least one processor is configured to execute program code stored on the memory device to initialize a control-value function, an observation-value function and sequence of states associated with a current episode. If a current epoch of the current episode is odd, the at least one processor is configured to select an observation-action, execute the observation-action to observe a partial image, and update the observation-value function based on the partial image and the control-value function. If the current epoch is even, the at least one processor is configured to select a control-action, execute the control-action to obtain a reward corresponding to the control-action, and update the control-value function based on the reward and the observation-value function.

In accordance with yet another embodiment of the present invention, a computer program product is provided. The computer program product includes a non-transitory computer readable storage medium having program code embodied therewith. The program code are executable by a computer to cause the computer to perform a method for reducing computation cost associated with a machine learning task performed by a computer system by implementing continuous control of attention for a deep learning network. The method performed by the computer includes initializing a control-value function and an observation-value function, and a sequence of states as associated with a current episode. If a current epoch of the current episode is odd, the method further includes selecting an observation-action, executing the observation-action to observe a partial image, and updating the observation-value function based on the observation-action and the control-value function. If the current epoch is even, the method further includes selecting a control-action, executing the control-action to obtain a reward corresponding to the control-action, and updating the control-value function based on the reward and the observation-value function.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 shows an exemplary application of a system/method for reducing computation cost associated with a machine learning task performed by a computer system by implementing continuous control of attention for a deep learning network, in accordance with an embodiment of the present invention;

DETAILED DESCRIPTION

Computational costs associated with deep learning methods can be undesirable in proportion to the number of units in connection. The embodiments described herein provide for systems and methods for implementing a deep learning network to provide continuous control of attention. The embodiments described herein can control masking (e.g., attention) and actions taken on partial images simultaneously. The masking can correspond to an observation-action and the control can correspond to a control-action. Accordingly, the embodiments described herein provide for a parallel control scheme that can be implemented by an artificial intelligence agent, or agent, in performing an artificial intelligence task. Illustratively, the agent can be a video game agent for performing an artificial intelligence task of playing a video game.

For example, an observation-action can correspond to a selection of a sub-area of a screen for obtaining a partial image of the screen corresponding to the sub-area. A control-action can correspond to a selection of an action (e.g., up, down, or stay). An observation-value function can map a pair including an observation-action and a state into a first cumulative reward, and a control-value function can map a pair including a control-action and a state into a second cumulative reward. The first and second cumulative rewards can correspond to respective real values that obtained by taking the observation-action and control-action, respectively, from the corresponding state. The state can be illustratively represented as a feature vector of a preceding sequence of observation-actions, observed partial images and control actions.

The embodiments described herein can be applied to a variety of real-world problems in the fields of artificial intelligence and machine learning that can implement deep learning. The embodiments described herein can reduce the computational costs associated with implementing a deep learning network by observing partial images, as opposed to entire images, in determining optimal actions to take (e.g., in a video game).

Figure 1:
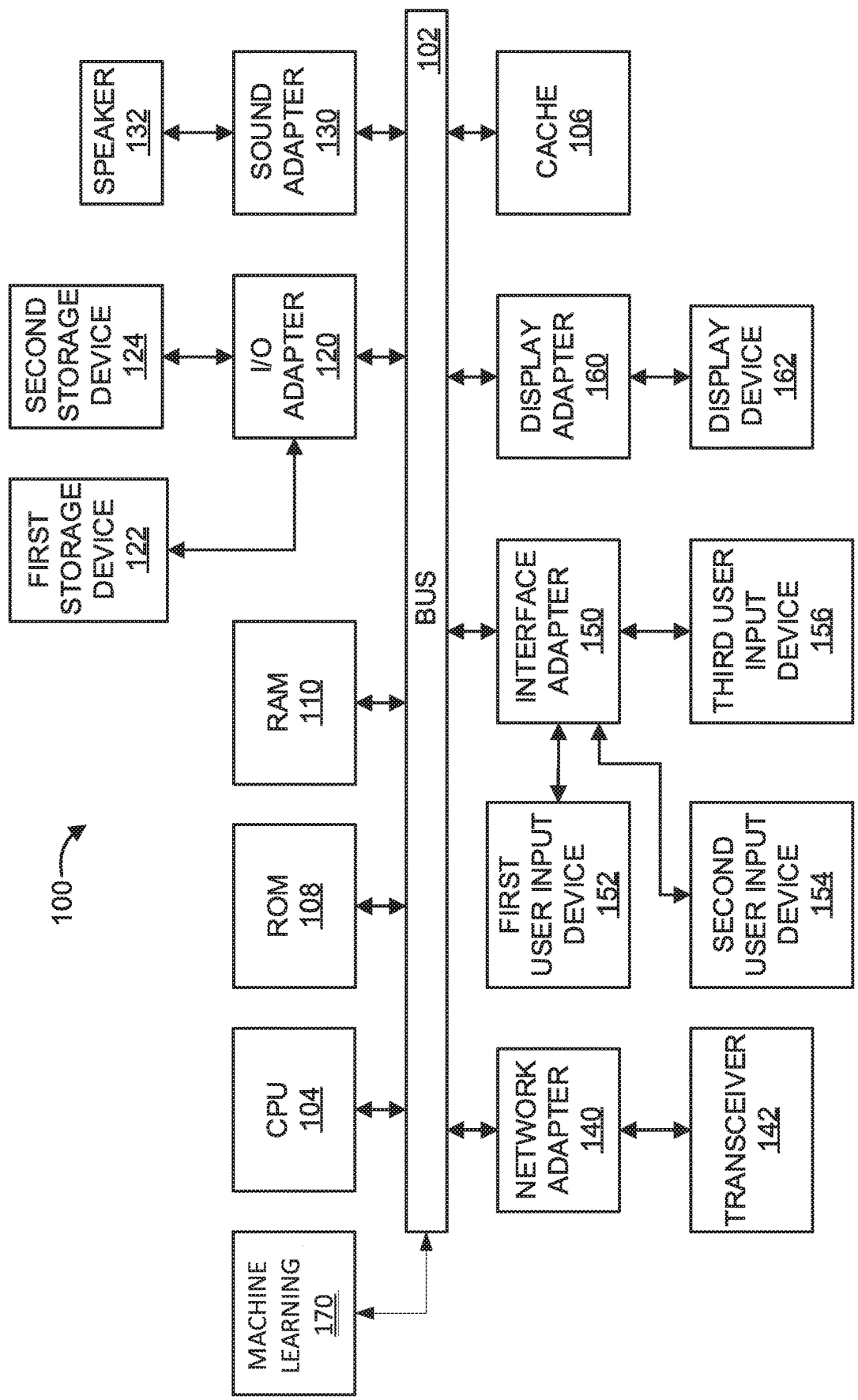
FIG. 1 is a block diagram of a processing system in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Machine learning component 170 may be operatively coupled to system bus 102. Machine learning component 170 is configured to perform one or more of the operations described below with reference to FIGS. 4 and 5. Machine learning component 170 can be implemented as a standalone special purpose hardware device, or may be implemented as software stored on a storage device. In the embodiment in which machine learning component 170 is software-implemented, although the anomaly detector is shown as a separate component of the computer system 100, machine learning component 170 can be stored on, e.g., the first storage device 122 and/or the second storage device 129. Alternatively, machine learning component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
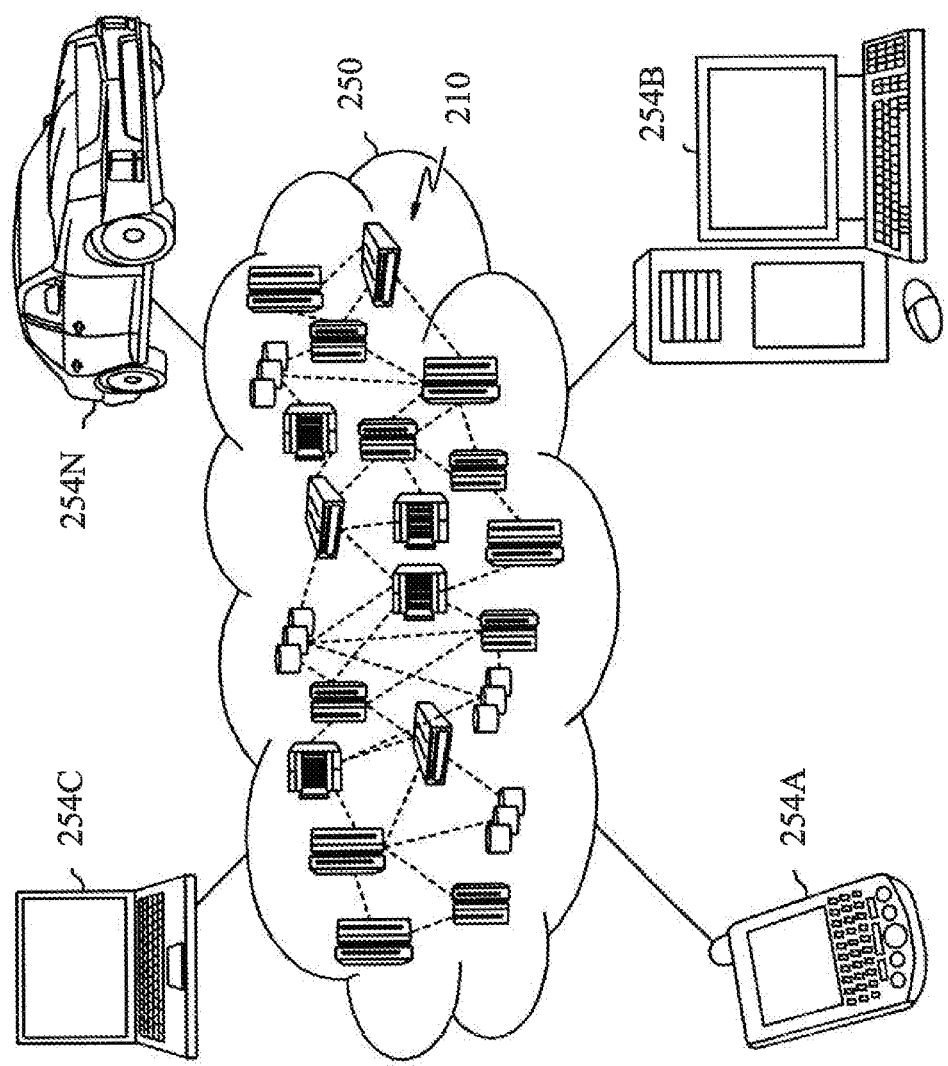
FIG. 2 is a block diagram showing an illustrative cloud computing environment having one or more cloud computing nodes with which local computing devices used by cloud consumers communicate in accordance with an embodiment.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
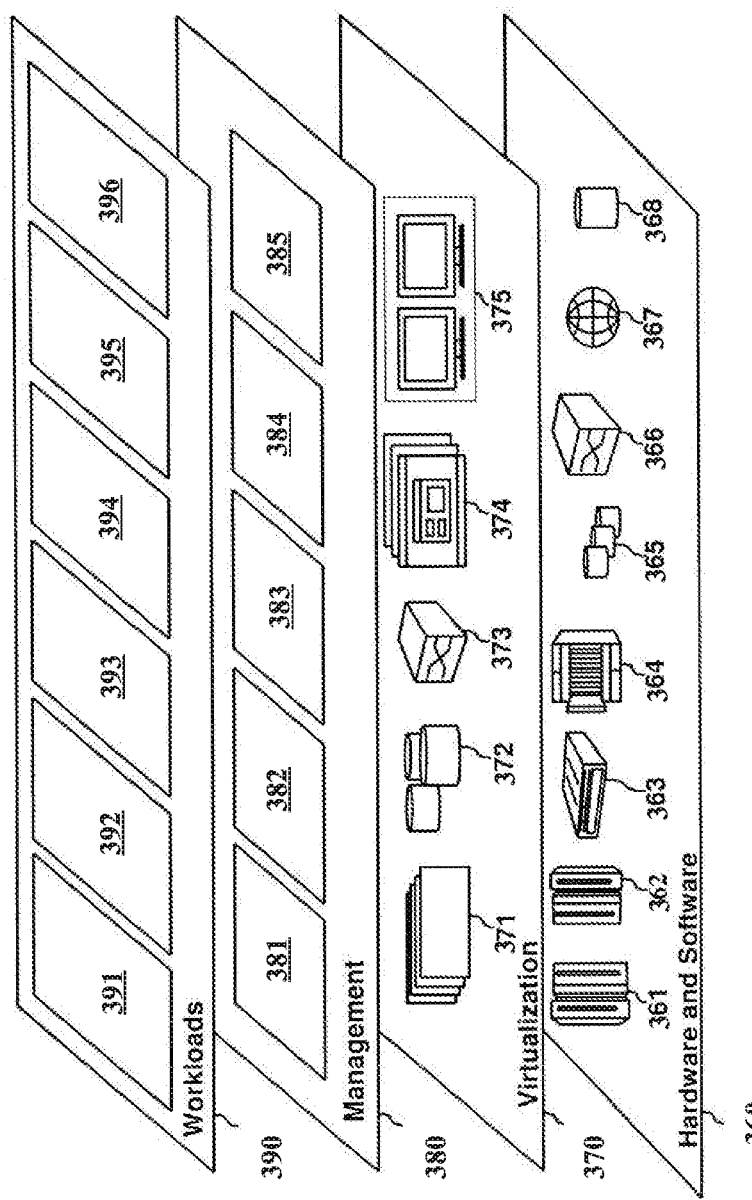
FIG. 3 is a block diagram showing a set of functional abstraction layers provided by a cloud computing environment in accordance with one embodiment.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and machine learning 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

In general, Markov decision processes (MDPs) model decision making in situations where outcomes are partly random and partly under control of at least one decision maker or agent. More specifically, MDPs can be thought of as discrete time stochastic control processes, where at each time step or epoch, the process is in a current state of an environment, the agent can take an action that is available in the state, and the process moves into a new state of the environment and provides an immediate reward (or cost) corresponding to the action taken. The goal is to select a policy that includes a sequence of optimal actions for the agent to take in interacting with the environment (e.g., the policy maximizes a cumulative reward). Workable solutions to MDP problems can be obtained by employing machine learning techniques (e.g., linear/dynamic programming and reinforcement learning), and can be used by artificial intelligence systems to choose optimal actions to take for a given task.

Figure 4:
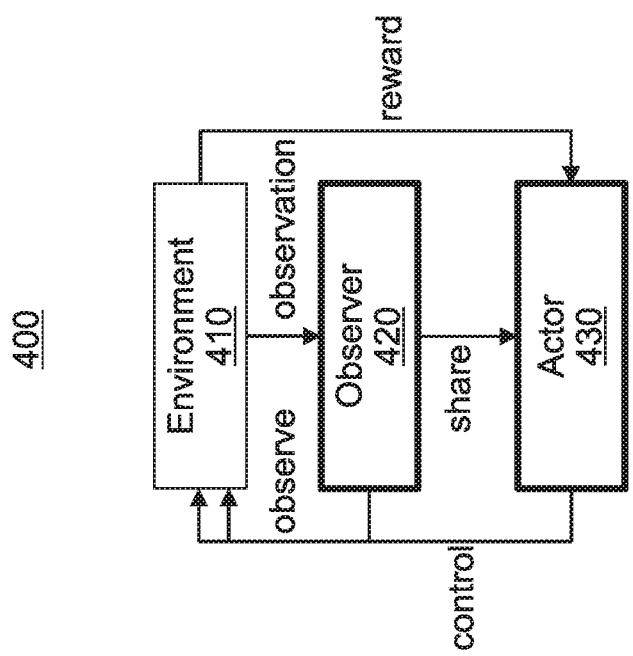
FIG. 4 illustrates diagrams comparing different types of Markov decision processes (MDPs), in accordance with an embodiment of the present invention.

Referring now to FIG. 4, a block/flow diagram illustrating a system 400 implementing a sequential partially observable MDP (SPOMDP) is provided. In practice, SPOMDPs are computationally intractable to solve, so computer-implemented methods are used to generate approximate solutions to SPOMDPs.

As shown, the system 400 includes an environment 410 and an observer agent 420 and an actor agent 430. The observer agent 420 selects an observation-action which most contributes to the state-action value function of the actor agent 430 and shares the observation-action with the actor agent 430. The actor agent 430 receives the observation-action from the observer agent 420, performs a control-action on the environment 410, and receives a reward from the environment 410 in response to the control-action. Although the system represents a multiple agent system with actor agent 430 being shown as a separate agent from the observer agent 420, in an another embodiment, the functionality of the actor agent 430 and the observer agent 420 can be implemented using a single agent.

Figure 5:
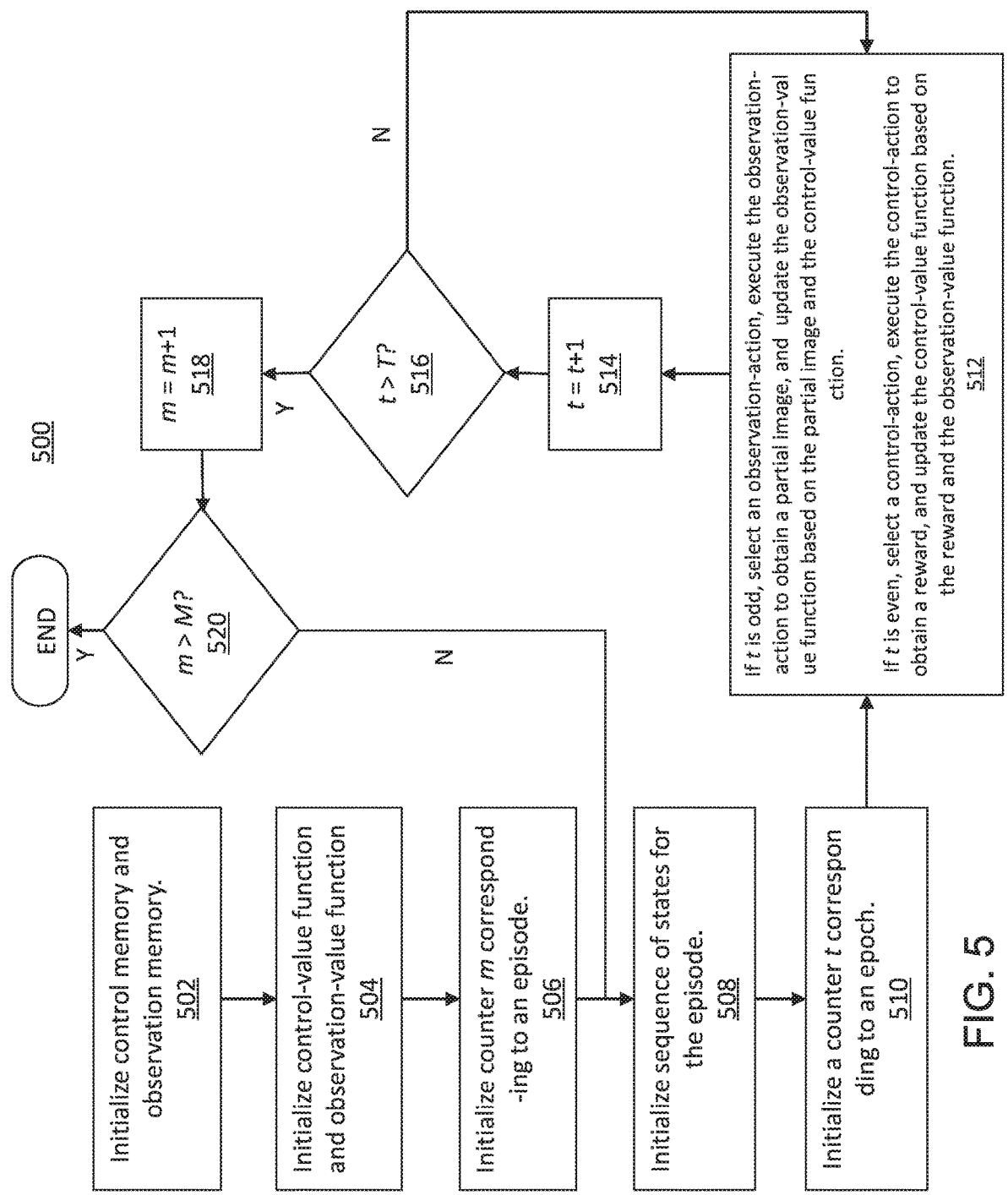
FIG. 5 is a block/flow diagram showing a system/method for reducing computation cost associated with a machine learning task performed by a computer system by implementing continuous control of attention for a deep learning network, in accordance with an embodiment of the present invention.

Referring to FIG. 5, a block/flow diagram 500 is provided illustrating an overview of a system/method for reducing computational costs by implementing continuous control of attention for a deep learning network, in accordance with an embodiment of the present invention.

At block 502, control memory $D_a$ and observation memory $D_o$ are each initialized. The control memory $D_a$ and observation memory $D_0$ can each be initialized to a given capacity N. In one embodiment, the control memory $D_a$ includes control-replay memory and the observation memory $D_o$ includes observation-replay memory, which can be associated with a video game being played by an artificial intelligence system. The control memory and the observation memory can be embodied in separate memory devices, or can be embodied in a single memory device.

At block 504, a control-value function $Q_a$ and an observation-value function $Q_o$ are each initialized. The control-value function $Q_a$ and an observation-value function $Q_o$ can be initialized with corresponding weights. The weights can be randomly chosen within desired values. For example, the weights can be chosen based on a random number function, which can be normalized to calibrate for variance based on the number of inputs. Further details regarding weight initialization will not be described herein.

At block 506, a counter m corresponding to an episode is initialized. An episode starts when an agent starts the machine learning task and ends when the machine learning task is over, and the next episode starts when the agent starts the machine learning task again. For example, in the context of a video game task, an episode starts when an agent starts playing the video game and ends when the video game is over, and the next episode starts when the agent starts the playing the video game from the beginning.

At block 508, a sequence of states $s_t=\{x\}$ for the episode is initialized and preprocessed, where t corresponds to a time step or epoch of the episode m. For example, it is assumed that the episode m includes T time steps or epochs. The sequence of states $s_t$ refers to the history of the states of the machine learning task. For example, in the context of a video game, the sequence of states $s_t$ for the episode refers to the history of the states of the video game. Thus, the sequence of states can be initialized as an empty sequence (e.g., corresponding to no sequence) or a sequence of length one including an initial state of the machine learning task (e.g., an initial state of the video game). In one embodiment, preprocessing the sequence of states includes creating a feature vector $\phi$ corresponding to the sequence of states $s_t$ (e.g., $\phi=\phi(s_t)$).

At block 510, a counter t corresponding to the epoch is initialized.

At block 512, if t is odd (e.g., by determining that t≡1 (mod 2)), then an observation-action $o_t$ is selected and an observation-value function $Q_o$ is chosen or updated, and if t is even (e.g., by determining that t≡0 (mod 2)), then a control-action $a_t$ is selected and a control-value function $Q_a$ is chosen or updated.

The following is an illustrative example of how the observation-action $o_t$ can be selected and the observation-value function $Q_o$ can updated at block 512.

In one embodiment, the observation-action $o_t$ can be selected as a random observation-action. For example, the observation-action $o_t$ can be selected as a random observation-action $o_t$ with probability $\varepsilon_1$. $\varepsilon_1$ is a parameter having a value set before the machine learning task begins (e.g., a hyperparameter). The value of $\varepsilon_1$ can be set based on, e.g., domain knowledge, validation, trial and error, etc. In one embodiment, the value of $\varepsilon$ can range from about 0.01 to about 0.1. However, any suitable value of $\varepsilon_1$ can be set in accordance with the embodiments described herein. Additionally, the value of $\varepsilon_1$ can be initialized to a relatively large value (e.g., 0.1), and gradually decreased as the number of completed episodes increases.

In another embodiment, the observation-action $o_t$ can be selected as an observation-action that corresponds to a maximum value of the observation-value function $Q_o$ (e.g., a best observation-action). For example, the observation-action $o_t$ can be selected as $$o_t = \max_o Q_o(\phi, o; \theta_o),$$

where $\theta_o$ refers to the parameters of the observation-value function $Q_o$. When the observation-value function $Q_o$ corresponds to a deep network, $\theta_o$ refers to the parameters of the deep network.

In one embodiment, updating the observation-value function $Q_o$ at block 512 includes executing the observation-action $o_t$ and observing a partial image $x_{t+1}$ corresponding to the next sequence of states. The partial image $x_{t+1}$ can correspond to a sub-area of screen displaying the image. For example, the observation-action $o_t$ can be executed using an emulator, and the observation-value function $Q_o$ can be updated by calculating a cumulative reward based on the control-value function. The next sequence of states can then be set as $s_{t+1} = s_t, o_t, x_{t+1}$ and preprocessed to create a feature vector $\phi_{t+1} = \phi(s_{t+1})$. The corresponding transition between the sequences of states, $(\phi_t, o_t, \phi_{t+1})$, can be stored in the observation memory $D_o$.

A random batch of transitions $(\phi_j, o_j, \phi_{j+1})$ can be sampled from the observation memory $D_o$, where $j = 1, \ldots, B_o$ and $B_o$ is the size of the dataset sampled from the observation memory $D_o$. For each j, a cumulative reward $y_j$ can be set. In one embodiment, $$y_j = \gamma \max_{a'} Q_a(\phi_{j+1}, a'; \theta_o),$$

where $\gamma = [0,1]$ corresponds to a discount factor that determines how much immediate rewards are favored over more distant rewards, and $$\max_{a'} Q_a(\phi_{j+1}, a'; \theta_o)$$

denotes the maximum value of $Q_a(\phi_{j+1}, a'; \theta_o)$ over all possible control-actions a'. $Q_a(\phi_{j+1}, a'; \theta_o)$ is an estimate of the cumulative reward that can be obtained from step j+1 by taking the control-action a' at step j+1, and $$\max_{a'} Q_a(\phi_{j+1}, a'; \theta_o)$$

is an estimate of the cumulative reward that can be obtained from step j+1 by taking the best control-action at step j+1. Since no reward is obtained by taking an observation-action at step j, $$\gamma \max_{a'} Q_a(\phi_{j+1}, a'; \theta_o)$$

is an estimate of the cumulative reward that can be obtained from step j, where the future reward is discounted by $\gamma$.

An optimization step can be performed based on the cumulative reward $y_j$ for each j to update the observation-value function $Q_o$. In one embodiment, for each j, an optimization step can be performed based on the summed squared difference between each cumulative reward $y_j$ and the value of the observation-value function $Q_o$ corresponding to the j-th observation $o_j$. For example, the optimization step can be performed on the function $f(\theta_o) = \Sigma_j(y_j - Q_o(\phi_j, o_j; \theta_o))^2$.

Illustratively, $f(\theta_o) = \Sigma_j(y_j - Q_o(\phi_j, o_j; \theta_o))^2$ can be minimized by tuning the values of $\theta$. To do this, in one embodiment, the optimization step includes performing a gradient descent method. For example, a gradient descent with respect to the parameters $\theta$ as follows:

$$\nabla f(\theta_o) = -2\Sigma_j(y_j - Q_o(\phi_j, o_j; \theta_o)) \nabla Q_o(\phi_j, o_j; \theta_o).$$

In the case that $Q_o(\phi_j, o_j; \theta_o)$ corresponds to a deep network, $\nabla Q_o(\phi_j, o_j; \theta_o)$ can be computed via backpropagation. Then, $\theta_o$ can updated according to $\theta_o \leftarrow \theta_o - \eta \nabla f(\theta_o)$, where $\eta$ is the learning rate (or step size), whose value may be adjusted according to the gradient descent method.

The following is an illustrative example of how to select the control-action $a_t$ and update the control-value function $Q_a$. In one embodiment, the space of possible control-actions is given a priori. In the context of a video game, a control-action can be given by the rules of the video game. For example, a control-action can be "press UP button."

In one embodiment, the control-action $a_t$ can be selected as a random control action $a_t$ with probability $\varepsilon_2$. $\varepsilon_2$ is a parameter having a value set before the machine learning task begins (e.g., a hyperparameter), which can have the same value as, or different value from, the parameter $\varepsilon_1$ described above.

In another embodiment, the control-action $a_t$ can be selected as a control-action that corresponds to a maximum value of the control-value function (e.g., a best control-action). For example, the control-action $a_t$ can be selected as $$a_t = \max_a Q_a(\phi, a; \theta_a),$$

where $\theta_a$ refers to the parameters of the control-value function. When the control-value function corresponds to a deep network, $\theta_a$ refers to the parameters of the deep network.

In one embodiment, updating the control-value function at block 512 includes executing the control-action $a_t$ (e.g., using an emulator). Instead of observing a partial image $x_{t+1}$, which is what is observed by the selected observation-action $o_t$, a reward $r_t$ corresponding to the selected control-action $a_t$ is observed. Then, the next sequence of states can be set as $s_{t+1} = s_t, a_t$ and preprocessed to create a feature vector $\phi_{t+1} = \phi(s_{t+1})$. The corresponding transition between the sequences of states, $(\phi_t, a_t, r_t, \phi_{t+1})$, can be stored in the control memory $D_a$.

A random batch of transitions $(\phi_j, a_j, r_j, \phi_{j+1})$ can be sampled from the control memory $D_a$, where $j = 1, \ldots, B_a$ and $B_a$ is the size of the dataset sampled from the control memory $D_a$. The value of $B_a$ can be the same value as, or a different value from, the value of $B_o$ described above.

For each j, a cumulative reward $y_j$ can be set. In one embodiment, the reward $y_j$ is determined as follows:

$$y_j = \begin{cases} r_j, & \text{for terminal } \phi_{j+1} \\ r_j + \gamma \max_{o'} Q_o(\phi_{j+1}, o'; \theta_o), & \text{for non-terminal } \phi_{j+1} \end{cases}$$

where a terminal $\phi_{j+1}$ corresponds to a terminal state (e.g., no action can be performed from that state), a non-terminal $\phi_{j+1}$ corresponds to a non-terminal state (e.g., an action can be performed from that state), $\gamma=[0,1]$ corresponds to a discount factor that determines how much immediate rewards are favored over more distant rewards, and $$\max_{o'} Q_o(\phi_{j+1}, o'; \theta_o)$$

denotes the maximum value of $Q_o(\phi_{j+1}, o'; \theta_o)$ over all possible observation-actions o'.

In one embodiment, the space of possible observation-actions is given a priori. In the context of a video game, a screen can be divided into an n×n grid for a suitable integer value n, and each $n^2$ sub-area can correspond to a respective observation-action.

An optimization step can be performed based on the reward $y_j$ for each j to update the control-value function $Q_a$. In one embodiment, for each j, an optimization step can be performed based on the summed squared difference between each cumulative reward $y_j$ and the value of the control-value function $Q_a$ corresponding to the j-th observation $a_j$. For example, the optimization step can be performed on the function $f(\theta_a)=\Sigma_j(y_j-Q_a(\phi_j, a_j; \theta_a))^2$.

Illustratively, $f(\theta_a)=\Sigma_j(y_j-Q_o(\phi_j, o_j; \theta_a))^2$ can be minimized by tuning the values of $\theta_a$. To do this, in one embodiment, the optimization step includes performing a gradient descent method. For example, a gradient descent with respect to the parameters $\theta_a$ as follows:

$$\nabla f(\theta_a)=-2\Sigma_j(y_j-Q_a(\phi_j,a_j;\theta_a))\nabla Q_a(\phi_j,a_j;\theta_a).$$

In the case that $Q_a(\phi_j, a_j; \theta_a)$ corresponds to a deep network, $\nabla Q_a(\phi_j, a_j; \theta_a)$ can be computed via, e.g., backpropagation. Then, $\theta_a$ can updated according to $\theta_a \leftarrow \theta_a - \eta \nabla f(\theta_a)$, where $\eta$ is the learning rate (or step size), whose value may be adjusted according to the gradient descent method.

Accordingly, at block 512, the selection of the observation-action and the control-action alternates between epochs, with the observation-value function being updated based on the control-value function, and the control-value function being updated based on the observation-value function.

At block 514, the counter t is updated and it is determined whether t is greater than a maximum value T at block 516. If not, the process reverts back to block 512.

If t is greater than T, this means that there are no more epochs left in the episode. The counter m is updated at block 518, and it is determined at block 520 whether m is greater than a maximum value M. If not, the process reverts back to block 508 to initialize the sequence of states for the subsequent episode. If m is greater than M, this means that there are no more episodes of the machine learning task left, and the process ends.

Referring now to FIG. 6, an exemplary video game 600 is provided illustrating an example of an application of the embodiments described herein. As shown, the game 600 is played in a grid environment, which can be randomly generated. At least a portion of the grid environment 610 is provided, which in this illustrative example, corresponds to a 6×6 cell grid. As shown, the at least a portion of the grid environment 610 includes open spaces 612 that are passable, and closed spaces 614 that are impassable.

The game 600 is shown including at least two players 620a and 620b who are battling each other. The object of the game 600 is to move around the grid environment to eliminate the opposing player(s) using landmines that can be planted at each open space 612. The landmines can be set to explode after a certain number of epochs or turns (e.g., 5 turns).

The actions of at least one of the players 620a and 620b can be selected by an artificial intelligence agent ("agent"). It will be assumed for the sake of illustration that the actions of player 620a are selected by an agent utilizing the embodiments described herein. For example, the agent can selection observation-actions and control-actions to take in making choices. The control-actions that the agent can select at each turn include UP, LEFT, DOWN, RIGHT, ATTACK (planting a landmine) and SKIP (to pass on the current turn).

Figure 7:
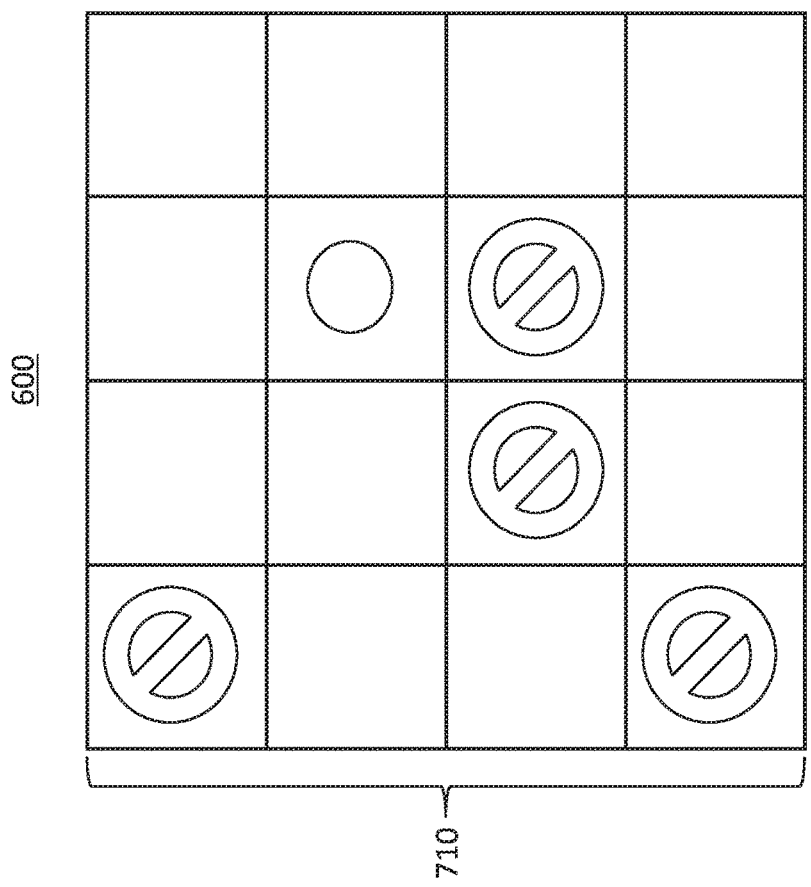
FIG. 7 shows an observation-action selected during the exemplary application of FIG. 6, in accordance with an embodiment of the present invention.

Referring to FIG. 7, to obtain an observation of the grid environment that can be used to select a control-action, the agent corresponding to player 620a selects an observation-action to observe a sub-area 710 around the player 620a in accordance with the embodiments described herein. As shown, the sub-area 710 is a 4×4 cell grid. However, the size and position of the sub-area should not be considered limiting.

Figure 8:
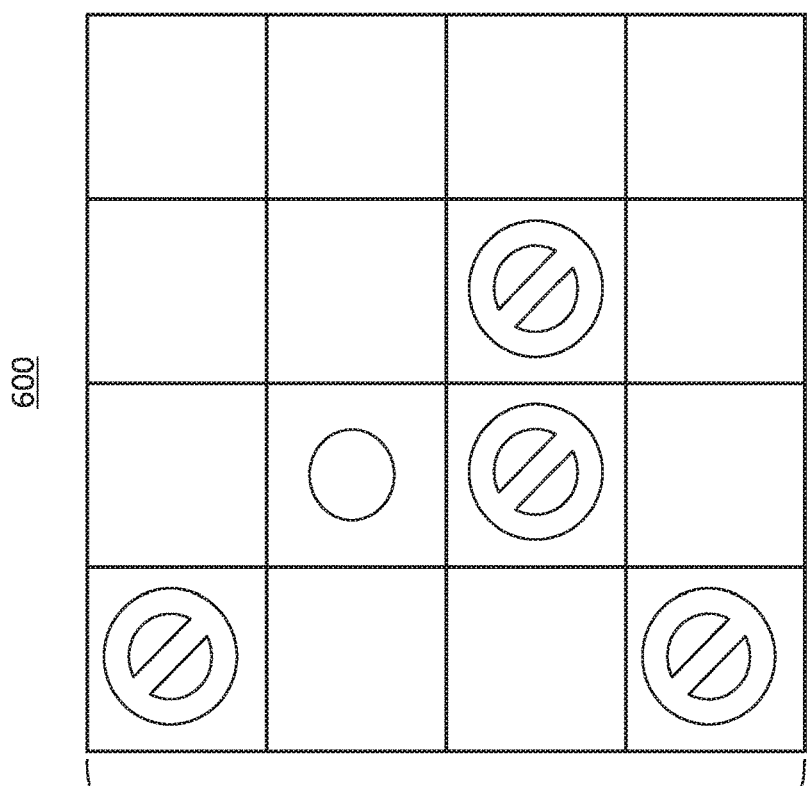
FIG. 8 shows a control-action selected based on the observation-acted selected in FIG. 7, in accordance with an embodiment of the present invention.

Referring to FIG. 8, the agent corresponding to the player 620a selects a control-action based on the observation made of the sub-area 710. In this illustrative example, the agent corresponding to the player 620a has selected the control-action of LEFT to move to the left adjacent passable space in the sub-area 710. Then, player 620a has completed its turn.

After player 620b takes its turn, the agent corresponding to player 620a can select a next observation-action to obtain a next observation corresponding to a different sub-area from the grid environment (which can be of a different size and position than the sub-area 710), and select a next control-action based on the next observation.

Besides the video game embodiment herein above, the embodiments described herein can be applied to any suitable artificial intelligence or machine learning tasks that can employ observation-actions and control-actions. For example, aspects of the present invention can be applied to implement artificial intelligence systems in the fields of, e.g., autonomous vehicle control, robot control, healthcare, remote sensing, etc.

The embodiments described herein allow an artificial intelligence agent to select observation-actions and control-actions in an approximately optimal way. By observing only a sub-area of an environment at a time, the computational complexity for the action selection processes performed by the agent is reduced. By selecting and observing suitable partial images (e.g., sub-areas), the agent can acquire information for selecting suitable control-actions to take.

Having described preferred embodiments of a system and method for continuous control of attention for a deep learning network (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reducing computation cost associated with a machine learning task performed by a computer system by implementing continuous control of attention for a deep learning network, comprising:

initializing, by at least one processor operatively coupled to a memory device, a control-value function, an observation-value function and a sequence of states associated with a current episode;
if a current epoch of the current episode is odd:
selecting, by the at least one processor, only an observation-action;
executing, by the at least one processor, the observation-action to observe a partial image; and
updating, by the at least one processor, the observation-value function based on the partial image and the control-value function; and
if the current epoch is even:
selecting, by the at least one processor, only a control-action;
executing, by the at least one processor, the control-action to obtain a reward corresponding to the control-action; and
updating, by the at least one processor, the control-value function based on the reward and the observation-value function.

2. The method of claim 1, wherein initializing the control-value function and the observation-value function include initializing the control-value function and the observation-value function with random weights.

3. The method of claim 1, wherein selecting the observation-action includes selecting the observation-action as a random observation-action or as an observation-action that corresponds to a maximum value of the observation-value function.

4. The method of claim 1, wherein selecting the control-action includes selecting the control-action as a random control-action or as a control-action that corresponds to a maximum value of the control-value function.

5. The method of claim 1, further comprising preprocessing the sequence of states to create a feature vector for selecting the observation-action or selecting the control-action.

6. The method of claim 1, wherein updating the observation-value function further comprises:
setting a next sequence of states corresponding to a next epoch based on the sequence of states, the observation-action and the partial image;
preprocessing the next sequence of states to create a next feature vector; and
storing a transition between the sequence of states and the next sequence of states in an observation memory.

7. The method of claim 6, wherein updating the observation-value function further comprises:
sampling a batch of transitions from the observation memory;
setting a cumulative reward based on the batch of transitions and the control-value function; and
performing an optimization step based on the cumulative reward and a value of the observation-value function for each observation-action of the batch of transitions.

8. The method of claim 1, wherein updating the control-value function further comprises:
setting a next sequence of states corresponding to a next epoch based on the sequence of states and the control-action;
preprocessing the next sequence of states to create a next feature vector; and
storing a transition between the sequence of states and the next sequence of states in a control memory.

9. The method of claim 8, wherein updating the control-value function further comprises:
sampling a batch of transitions from the control memory;
setting a cumulative reward based on the batch of transitions and the observation-value function; and
performing an optimization step based on the cumulative reward and a value of the control-value function for each control-action of the batch of transitions.

10. A system for reducing computation cost associated with a machine learning task performed by a computer system by implementing continuous control of attention for a deep learning network, comprising:
a memory device for storing program code; and
at least one processor operatively coupled to the memory device and configured to execute program code stored on the memory device to:
initialize a control-value function, an observation-value function and a sequence of states associated with a current episode;
if a current epoch of the current episode is odd:
select only an observation-action;
execute the observation-action to observe a partial image; and
update the observation-value function based on the partial image and the control-value function; and
if the current epoch is even:
select only a control-action;
execute the control-action to obtain a reward corresponding to the control-action; and
update the control-value function based on the reward and the observation-value function.

11. The system of claim 10, wherein the at least one processor is configured to initialize the control-value function and the observation-value function with random weights.

12. The system of claim 10, wherein the at least one processor is configured to select the observation-action as a random observation-action or as an observation-action that corresponds to a maximum value of the observation-value function.

13. The system of claim 10, wherein the at least one processor is configured to select the control-action as a random control-action or as a control-action that corresponds to a maximum value of the control-value function.

14. The system of claim 10, wherein the at least one processor is further configured to execute program code stored on the memory device to preprocess the sequence of states to create a feature vector for selecting the observation-action or selecting the control-action.

15. The system of claim 10, wherein, in updating the observation-value function, the at least one processor is further configured to execute program code stored on the memory device to:
set a next sequence of states corresponding to a next epoch based on the sequence of states, the observation-action and the partial image;
preprocess the next sequence of states to create a feature vector; and
store a transition between the sequence of states and the next sequence of states in an observation memory.

16. The system of claim 15, wherein, in updating the observation-value function, the at least one processor is further configured to execute program code stored on the memory device to:
sample a batch of transitions from the observation memory;
set a cumulative reward based on the batch of transitions and the control-value function; and perform an optimization step based on the cumulative reward and a value of the observation-value function for each observation-action of the batch of transitions.

17. The system of claim 10, wherein, in updating the control-value function, the at least one processor is further configured to execute program code stored on the memory device to:
set a next sequence of states corresponding to a next epoch based on the sequence of states and the control-action;
preprocess the next sequence of states to create a feature vector; and
store a transition between the sequence of states and the next sequence of states in a control memory.

18. The system of claim 17, wherein, in updating the control-value function, the at least one processor is further configured to execute program code stored on the memory device to:
sample a batch of transitions from the control memory;
set a cumulative reward based on the batch of transitions and the observation-value function; and
perform an optimization step based on the cumulative reward and a value of the control-value function for each control-action of the batch of transitions.

19. A computer program product comprising a non-transitory computer readable storage medium having program instructions embodied therewith, the program instructions executable by a computer to cause the computer to perform a method for reducing computation cost associated with a machine learning task performed by a computer system by implementing continuous control of attention for a deep learning network, the method performed by the computer comprising:
initializing a control-value function, an observation-value function and a sequence of states associated with a current episode;
if a current epoch of the current episode is odd:
selecting only an observation-action;
executing the observation-action to observe a partial image; and
updating the observation-value function based on the partial image and the control-value function; and
if the current epoch is even:
selecting only a control-action;
executing the control-action to obtain a reward corresponding to the control-action; and
updating the control-value function based on the reward and the observation-value function.

20. The computer program product of claim 19, wherein:
updating the observation-value function further comprises:
setting a next sequence of states corresponding to a next epoch based on the sequence of states, the observation-action and the partial image;
preprocessing the next sequence of states to create a next feature vector;
storing a transition between the sequence of states and the next sequence of states in an observation memory;
sampling a batch of transitions from the observation memory;
setting a cumulative reward based on the batch of transitions and the control-value function; and
performing an optimization step based on the cumulative reward and a value of the observation-value function for each observation-action of the batch of transitions; and
updating the control-value function further comprises:
setting a next sequence of states corresponding to a next epoch based on the sequence of states and the control-action;
preprocessing the next sequence of states to create a feature vector;
storing a transition between the sequence of states and the next sequence of states in a control memory;
sampling a batch of transitions from the control memory;
setting a cumulative reward based on the batch of transitions and the observation-value function; and
performing an optimization step based on the cumulative reward and a value of the control-value function for each control-action of the batch of transitions.

\* \* \* \* \*